Oct. 13, 1931.  L. B. ROTH  1,826,899
LAWN MOWER
Filed Sept. 13, 1928  2 Sheets-Sheet 1
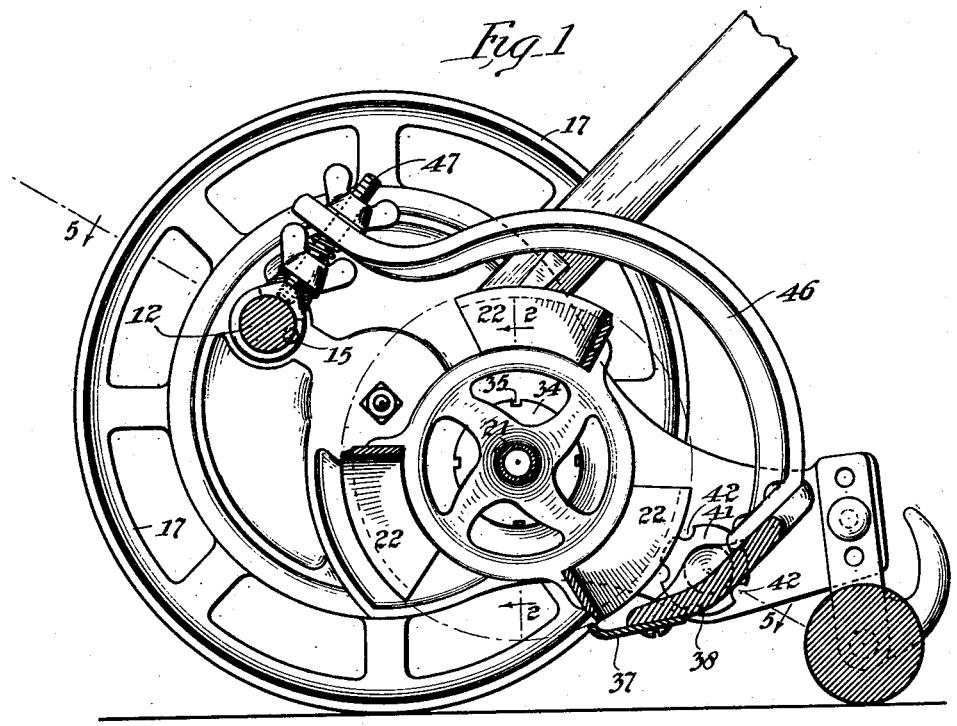
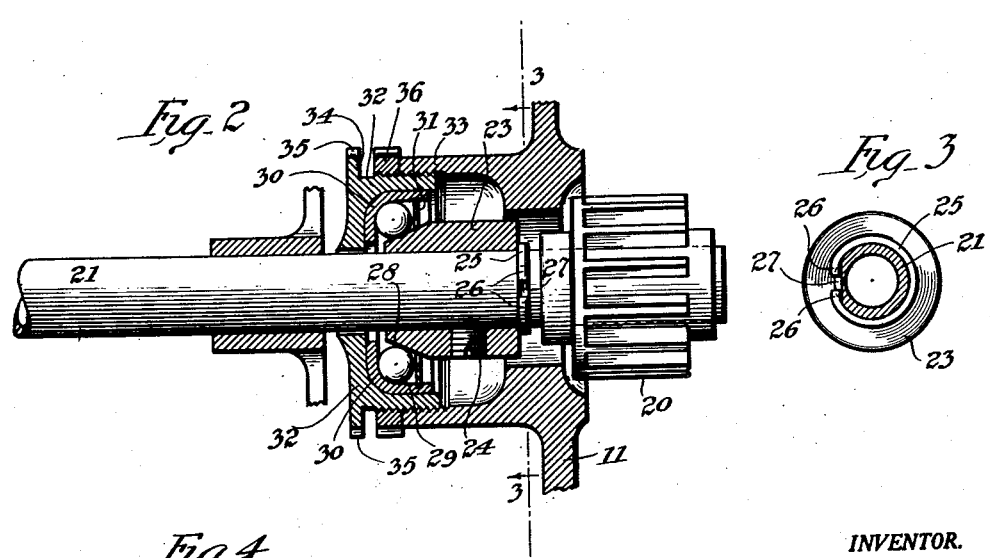
INVENTOR.
Lester B. Roth
BY Brayton Richards
ATTORNEY.

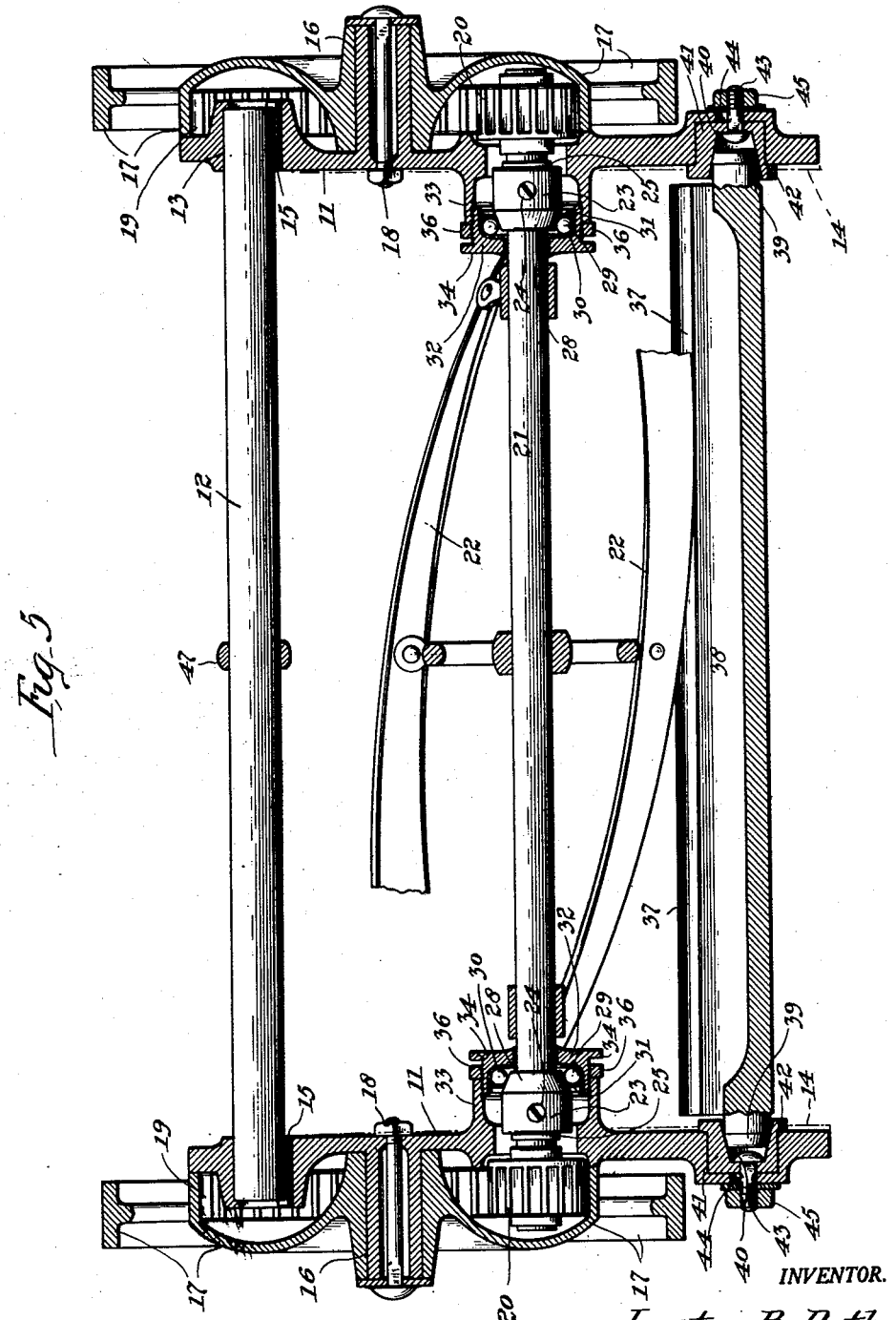

Patented Oct. 13, 1931

1,826,899

UNITED STATES PATENT OFFICE

LESTER BURTRAM ROTH, OF PROPHETSTOWN, ILLINOIS, ASSIGNOR TO ECLIPSE LAWN MOWER COMPANY, OF PROPHETSTOWN, ILLINOIS, A CORPORATION OF ILLINOIS

LAWN MOWER

Application filed September 13, 1928. Serial No. 305,679.

The present invention relates to lawn mowers of the type in which a rotary cutting-reel cooperates with a stationary cutter-bar to cut grass, or the like, when the lawn mower is propelled over the ground.

The primary object of the present invention is to provide improved lawn mower construction of the type indicated, provided with improved bearings for the rotary reel.

Another object is to provide such improved bearings for the reel, so constructed and arranged that tightening of said bearings cooperates with the frame of the lawn mower to more securely hold the cutter-bar in correct position therein.

Another object of the invention is the provision of an improved mounting for the cutter bar.

Other objects will appear hereinafter.

The invention consists in the combinations and arrangements of parts hereinafter described and claimed.

The invention will be best understood by reference to the accompanying drawings forming a part of this specification, and in which Fig. 1 is a partial longitudinal vertical section of a lawn mower embodying the invention.

Fig. 2, an enlarged section taken substantially on line 2—2 of Fig. 1.

Fig. 3, a partial section taken substantially on line 3—3 of Fig. 2.

Fig. 4, a detail view of one of two bearing bushings employed in the construction, and Fig. 5, a section taken substantially on line 5—5 of Fig. 1.

The preferred form of construction as illustrated in the drawings comprises a suitable supporting frame made up of side members 11 rigidly connected together by means of a tie-rod 12 fitted snuggly in sockets 13, as indicated. The sockets 13 are given a slight angular pitch with reference to each other so that when the ends of the tie-rod 12 are driven therein, the frame side members 11 will be given a slight inward inclination, or convergence, toward each other, whereby, before assembling of the cutter-bar, the inner edges of the side frames will converge toward each other along the dotted lines 14 of Fig. 5. The side frames are further rigidly secured in place on the ends of the tie-rod 12, by means of keys 15 driven into suitable keyways provided in said rod and side frames, as indicated, and whereby a rigid connection is effected which will normally hold said frames in inwardly converging relation.

The side frames are provided with outwardly extending bearings 16 upon which the usual traction wheels 17 are mounted and held in place by the usual bolts 18. The traction wheels 17 carry the usual internal gears 19, meshing with the usual pinions 20, having a pawl and ratchet connection with the ends of the reel shaft 21, carrying the usual cutter-plates 22, as will be readily understood by those skilled in this art.

At each end the reel shaft 21 is given a bearing in the corresponding side frame of the mower to provide such bearing, cone members 23 are secured, as shown, to each end of said shaft by means of set screws 24. In order to insure that the cones 23 will be secured in proper position on said shaft, the said shaft is provided with two positioning rings 25 having inwardly turned ends 26, engaging notches 27 of said shaft, and whereby said rings will be accurately positioned on said shaft. As shown, each cone is secured in contact with the inner edge of the corresponding ring 25, so that each cone will be accurately positioned on the shaft. Each of the cones 23 is provided at its inner edge with an inwardly tapering conical bearing surface 28, adapted to receive and support the usual balls 29 of the ball bearing. The ball bearing comprises a ball raceway 30 of suitable material, as shown, and the balls are held in said raceway by means of a retaining ring 31, as will be readily understood. Each ball raceway is mounted in a corresponding bearing cup, or sleeve, 32, threaded as shown, in a suitable bearing hub 33, formed on the inner side of the corresponding frame member 11. Each ball cup 32 carries a flange 34 having notches 35 therein for adjusting purposes. The ball raceway 30 fits snugly and is pressed into the corresponding ball cup 32, and whereby the balls 29 will be held in proper relation with the corresponding cone 23, as will be readily understood. By this arrangement, it will be noted, that by turning the cup 32, the relation between the balls 29 and the cone 23 may be nicely adjusted, and that any reaction thus exerted on the side frames 11 will be inwardly. A suitable notched annular locking nut 36 is provided on each of the ball cups 32 so that the same may be locked in adjusted positions.

A cutter-bar is arranged in the mower frame in cooperative relationship with the reel blades 22. This cutter-bar consists of a steel blade 37 secured to a supporting bar 38, as indicated, and the supporting bar 38 is provided at each end with tapered trunnions 39, adapted and arranged to fit tapered bearing sockets 40 in corresponding bearing bushings 41, rotatably mounted, as shown in the corresponding side frame 11. The bearing sockets 40 are eccentrically arranged in the bearing bushings 41, as best indicated in Fig. 4, so that by rotating the bushings 41 in their bearings in the side frames, the ends of the cutter-bar may be adjusted independently with reference to the reel blades 22. In order to facilitate such adjustments of the bearing bushings 41, the same are provided with notched flanges 42, as indicated. Each bearing bushing 41 is adjustably secured in position in its frame 11 by means of a bolt 43 projecting outwardly from, and coaxially with, each bearing bushing, and through a suitable opening 44 provided in the corresponding side frame for the purpose, each opening 44 being large enough to permit of the eccentric movement of the bolt. Each bolt is provided with a clamping nut 45 by means of which the corresponding bearing bushing may be secured in adjusted position. By this arrangement a simple and effective means is provided for permitting adjustments of the bearing bushings 41, and the locking of the bushings in adjusted positions. The length of the cutter-bar and the projecting trunnions 39 is made such as to require a slight springing apart of the side frames 11 into the full line positions indicated in Fig. 5 when the parts are assembled, so that there is always an inward tension on the side frames 11 tending to maintain proper bearing contact between the trunnions 39 and the bearing bushings 41. It is also to be noted in this connection that when the ball cups 32 are adjusted, as explained above to tighten the ball bearings for the ends of the reel shaft 21, any reaction exerted by the balls 29 will also exert an inward draw or tension on the side frames 11, and thus also tend to maintain proper bearing relations between the trunnions 39 and the bearing bushings 41. In this way, proper bearing relations will always be maintained between said trunnions and bushings.

The supporting bar 38 has attached thereto a forwardly and upwardly extending gooseneck adjusting arm 46 adjustably secured by means of a suitable bolt 47 with the tie-rod 12, and whereby the relation between the cutter-plate 37, and the reel plates 22 may be nicely adjusted, as will be readily understood by those skilled in this art.

While I have illustrated and described the preferred form of construction for carrying my invention into effect, this is capable of variation and modification without departing from the spirit of the invention. I therefore do not wish to be limited to the precise details disclosed, but desire to avail myself of such variations and modifications as fall within the scope of the appended claims:

Having thus described my invention, what I claim as new and desire to secure by Letters Patent is:

1. A lawn mower comprising a frame; a cutter-bar having bearings at its ends in said frame; a revolving reel cooperating therewith; bearings for said reel in said frame; and means for tightening said bearings, arranged to draw the sides of said frame inwardly and tighten the cutter bar bearings.

2. A lawn mower comprising a frame; a cutter-bar having bearings at its ends in said frame; a revolving reel consisting of a shaft and plates mounted thereon to cooperate with said cutter-bar; bearing sockets on the inner sides of said frame, the ends of said shaft projecting into said sockets; cooperating bearing members for said shaft in said sockets; and means for tightening said bearing members arranged to draw the sides of said frame inwardly and tighten the cutter bar bearings.

3. A lawn mower comprising a frame; a cutter-bar having bearings at its ends in said frame; a revolving reel consisting of shaft and plates mounted thereon to cooperate with said cutter-bar; bearing sockets on the inner sides of said frame, the ends of said shaft projecting into said sockets; bearing members fixed to said shaft ends and provided with conical bearing surfaces tapering inwardly; and cooperating bearing elements threaded in said sockets and arranged to draw the sides of said frame inwardly upon tightening of said bearings to tighten the cutter bar bearings.

4. A lawn mower comprising a frame; a cutter-bar having bearings at its ends in said frame; a revolving reel consisting of a shaft and plates mounted thereon to cooperate with said cutter-bar; bearing sockets on the inner sides of said frame, the ends of said shaft projecting into said sockets; ball bearing members fixed to said shaft ends and provided with conical bearing surfaces tapering inwardly; and cooperating ball bearing elements threaded in said sockets and arranged to draw the sides of said frame inwardly upon tightening of said bearings to tighten the cutter bar bearings.

5. A lawn mower comprising a frame; a cutter-bar loosely mounted between the sides of said frame, the sides of said frame being given an inward tension to hold said cutter-bar in place; a revolving reel cooperating with said cutter-bar; bearings for said reel in said frame; and means for tightening said bearings arranged to draw the sides of said frame inwardly.

6. A lawn mower comprising a frame; a cutter-bar loosely mounted between the sides of said frame, the sides of said frame being given an inward tension to hold said cutter-bar in place; a revolving reel consisting of a shaft and blades mounted thereon to cooperate with said cutter-bar; bearing sockets on the inner sides of said frame, the ends of said shaft projecting into said sockets; cooperating bearing members for said shaft in said sockets; and means for tightening said bearing members arranged to draw the sides of said frame inwardly.

7. A lawn mower comprising a frame; a cutter-bar loosely mounted between the sides of said frame, the sides of said frame being given an inward tension to hold said cutter-bar in place; a revolving reel consisting of a shaft and blades mounted thereon to cooperate with said cutter-bar; bearing sockets on the inner sides of said frame, the ends of said shaft projecting into said sockets; bearing members fixed to said shaft ends and provided with conical bearing surfaces tapering inwardly; and cooperating bearing elements threaded in said sockets and arranged to draw the sides of said frame inwardly upon tightening of said bearings.

8. A lawn mower comprising a frame; a cutter-bar loosely mounted between the sides of said frame, the sides of said frame being given an inward tension to hold said cutter-bar in place; a revolving reel consisting of a shaft and blades mounted thereon to cooperate with said cutter-bar; bearing sockets on the inner sides of said frame; the ends of said shaft projecting into said sockets; ball bearing members fixed to said shaft ends and provided with conical bearing surfaces tapering inwardly; and cooperating ball bearing elements threaded in said sockets and arranged to draw the sides of said frame inwardly upon tightening of said bearings.

9. A lawn mower comprising a frame; a cutter-bar having tapered trunnions at its ends; bearing bushings rotatably mounted in the sides of said frame and provided with eccentrically arranged tapered bearing sockets to receive said trunnions, the sides of said frame being given an inward tension to hold said cutter-bar in place; a binding bolt projecting outwardly from, and coaxially with, each bushing; a binding nut on the outer end of each of said bolts; a revolving reel cooperating with said cutter-bar; bearings for said reel in said frame; and means for tightening said bearings arranged to draw the sides of said frame inwardly.

10. A lawn mower comprising a frame; a cutter-bar having tapered trunnions at its ends; bearing bushings rotatably mounted in the sides of said frame and provided with eccentrically arranged tapered bearing sockets to receive said trunnions, the sides of said frame being given an inward tension to hold said cutter-bar in place; a binding bolt projecting outwardly from, and coaxially with, each bushing; a binding nut on the outer end of each of said bolts; a revolving reel consisting of a shaft and blades mounted thereon to cooperate with said cutter-bar; bearing sockets on the inner sides of said frame, the ends of said shaft projecting into said sockets; cooperating bearing members for said shaft in said sockets; and means for tightening said bearing members arranged to draw the sides of said frame inwardly.

11. A lawn mower comprising a frame; a cutter-bar having tapered trunnions at its ends; bearing bushings rotatably mounted in the sides of said frame and provided with eccentrically arranged tapered bearing sockets to receive said trunnions, the sides of said frame being given an inward tension to hold said cutter-bar in place; a binding bolt projecting outwardly from, and coaxially with, each bushing; a binding nut on the outer end of each of said bolts; a revolving reel consisting of a shaft and blades mounted thereon to cooperate with said cutter-bar; bearing sockets on the inner sides of said frame, the ends of said shaft projecting into said sockets; bearing members fixed to said shaft ends and provided with conical bearing surfaces tapering inwardly; and cooperating elements threaded in said sockets and arranged to draw the sides of said frame inwardly upon tightening of said bearings.

12. A lawn mower comprising a frame; a cutter-bar having tapered trunnions at its ends; bearing bushings rotatably mounted in the sides of said frame and provided with eccentrically arranged tapered bearing sockets to receive said trunnions, the sides of said frame being given an inward tension to hold said cutter-bar in place; a binding bolt projecting outwardly from, and coaxially with the bore of each bushing; a binding nut on the outer end of each of said bolts; a revolving reel consisting of a shaft and blades mounted thereon to cooperate with said cutter-bar; bearing sockets on the inner sides of said frame; the ends of said shaft projecting into said sockets; ball bearing members fixed to said shaft ends and provided with conical bearing surfaces tapering inwardly; and cooperating ball bearing elements threaded in said sockets and arranged to draw the sides of said frame inwardly upon tightening of said bearings.

13. A lawn mower comprising a frame; a cutter-bar having tapered trunnions at its ends; bearing bushings rotatably mounted in the sides of said frame and provided with eccentrically arranged tapered bearing sockets to receive said trunnions, the sides of said frame being given an initial inward bias at their rear ends thereby imparting an inward tension to hold said cutter-bar in place; a binding bolt projecting outwardly from, and coaxially with the bore of each bushing; a binding nut on the outer end of each of said bolts; and a revolving reel mounted in said frame and cooperating with said cutter-bar.

In witness whereof, I have hereunto set my hand this 10 day of September, 1928.

LESTER BURTRAM ROTH.